United States Patent
Dani et al.

(10) Patent No.: US 9,252,588 B2
(45) Date of Patent: Feb. 2, 2016

(54) SERVICE VOLTAGE LOAD PROTECTION IN AN ELECTRIC UTILITY METER

(71) Applicant: Landis+Gyr Inc., Lafayette, IN (US)

(72) Inventors: Akash Dani, West Lafayette, IN (US); Michael Anderson, West Lafayette, IN (US); John T. Voisine, Lafayette, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 229 days.

(21) Appl. No.: 13/722,432

(22) Filed: Dec. 20, 2012

(65) Prior Publication Data

US 2013/0242445 A1 Sep. 19, 2013

Related U.S. Application Data

(60) Provisional application No. 61/577,971, filed on Dec. 20, 2011.

(51) Int. Cl.
| | |
|---|---|
| *H02H 3/20* | (2006.01) |
| *H02H 9/04* | (2006.01) |
| *H02H 3/027* | (2006.01) |
| *H02J 13/00* | (2006.01) |
| *H02H 3/247* | (2006.01) |

(52) U.S. Cl.
CPC ............. *H02H 3/207* (2013.01); *H02H 3/027* (2013.01); *H02H 3/247* (2013.01); *H02J 13/0013* (2013.01); *Y02B 90/244* (2013.01); *Y02E 60/725* (2013.01); *Y02E 60/7807* (2013.01); *Y04S 10/20* (2013.01); *Y04S 20/327* (2013.01); *Y04S 20/36* (2013.01); *Y04S 40/12* (2013.01)

(58) Field of Classification Search
CPC ...... G01R 22/061; G01R 22/10; G01R 22/00; G01R 22/06; G01R 22/068; H02H 3/207
USPC ............................ 361/91.1, 115, 86, 88–91.3
See application file for complete search history.

(56) References Cited

U.S. PATENT DOCUMENTS

| | | | | |
|---|---|---|---|---|
| 4,590,533 | A * | 5/1986 | Murata | H02H 3/20 340/662 |
| 5,737,168 | A * | 4/1998 | Baker | H02H 3/207 361/84 |
| 6,167,329 | A * | 12/2000 | Engel | H02H 7/261 361/93.2 |
| 6,434,715 | B1 * | 8/2002 | Andersen | G06F 11/0772 340/638 |
| 7,091,878 | B2 * | 8/2006 | Holle | G01R 22/066 324/110 |
| 7,564,667 | B2 * | 7/2009 | Veroni | H02H 3/0935 361/42 |
| 2003/0227729 | A1 * | 12/2003 | Wenzel | G05F 1/569 361/91.3 |
| 2008/0172192 | A1 * | 7/2008 | Banhegyesi | G01R 22/10 702/61 |
| 2008/0258709 | A1 * | 10/2008 | Shuey | G01R 19/16547 324/110 |

(Continued)

*Primary Examiner* — Stephen W Jackson
*Assistant Examiner* — Christopher Clark
(74) *Attorney, Agent, or Firm* — Maginot, Moore & Beck LLP

(57) ABSTRACT

An arrangement for controllably disconnecting a utility power service from a load includes a utility meter housing, a switch and a processing circuit. The utility meter housing includes metrology circuitry configured to generate metering information regarding electrical power provided to the load. The switch is configured to controllably interrupt a connection between the utility power service and the load. The switch has an open state and a closed state. The processing circuit is configured to determine whether a line voltage varies from an expected value by more than a predetermined amount over a predetermined amount of time. The processing circuit is further configured to cause a change in state of the switch based on the determination.

20 Claims, 5 Drawing Sheets

(56) References Cited

U.S. PATENT DOCUMENTS

| | | | | |
|---|---|---|---|---|
| 2009/0261805 A1* | 10/2009 | Shuey | G01R 21/133 | 324/76.11 |
| 2010/0185338 A1* | 7/2010 | Montgomery | H02J 3/14 | 700/292 |
| 2011/0187206 A1* | 8/2011 | Hart | G01D 4/02 | 307/328 |
| 2011/0242715 A1* | 10/2011 | Voisine | G01R 11/17 | 361/65 |
| 2013/0054165 A1* | 2/2013 | Ramirez | G01R 22/061 | 702/62 |
| 2013/0178994 A1* | 7/2013 | Valluri | G01R 22/061 | 700/292 |
| 2013/0191053 A1* | 7/2013 | Spanier | G01R 22/10 | 702/60 |
| 2014/0222357 A1* | 8/2014 | Spanier | G01R 22/10 | 702/60 |

\* cited by examiner

SERVICE VOLTAGE LOAD PROTECTION IN AN ELECTRIC UTILITY METER

This application claims the benefit of U.S. Provisional Patent Application Ser. No. 61/577,971, filed Dec. 20, 2011, which is incorporated herein by reference.

FIELD OF THE INVENTION

The present invention relates to utility meters, and more particularly, to electricity meters connected to the electrical service of a load.

BACKGROUND

Electrical service providers such as electrical utilities employ electricity meters to monitor energy consumption by customers (or other entities). Electricity meters track the amount of energy consumed by a load (e.g. the customer), typically measured in kilowatt-hours ("kwh"), at each customer's facility. The service provider uses the consumption information primarily for billing, but also for resource allocation planning and other purposes.

Electrical power is transmitted and delivered to load in many forms. For example, electrical power may be delivered as polyphase wye-connected or delta-connected power or as single phase power. Such various forms are known as service types. Different standard electricity meter types, known as meter forms, are used to measure the power consumption for the various service types. The commonly used meter forms in the United States include those designated as 2S, 3S, 5S, 45S, 6S, 36S, 9S, 16S, 12S and 25S meter forms, which are well known in the art.

While utility electrical power systems are designed to deliver a consistent service voltage level (e.g. 240 volts AC), system strain and other factors can result in temporary variances in service voltage. For example, it is possible for service voltage to all or parts of a utility service area to surge (exceed the nominal or expected voltage) by 20% or more. Similarly, in so-called brown out situations, the service voltage can be reduced (i.e. a voltage sag).

A problem with service voltage sags and swells is that they can create strain on end-user equipment and systems that are designed to work with the nominal service voltage. For example, the motors of an HVAC system may overheat and be damaged if the service voltage is too low, and or an entertainment system may be damaged by too high of a service voltage.

There is a need therefore, for protecting user equipment from potentially damaging power sags and/or power surges.

SUMMARY

The present invention employs an arrangement that detects service surge and/or sag, and operates a switch to disconnect the customer (or other) load from the utility power line if a sustained overvoltage event or undervoltage event is detected. In some embodiments, the meter disconnects the load using a service switch that is otherwise provided in the meter for other purposes, such as load control, prepayment services, etc.

A first embodiment is an arrangement for controllably disconnecting a utility power service from a load that includes a utility meter housing, a switch and a processing circuit. The utility meter housing includes metrology circuitry configured to generate metering information regarding electrical power provided to the load. The switch is configured to controllably interrupt a connection between the utility power service and the load. The switch has an open state and a closed state. The processing circuit is configured to determine whether a line voltage varies from an expected value by more than a predetermined amount over a predetermined amount of time. The processing circuit is further configured to cause a change in state of the switch based on the determination.

The above-described features and advantages, as well as others, will become more readily apparent to those of ordinary skill in the art by reference to the following detailed description and accompanying drawings.

DETAILED DESCRIPTION

Figure 1:
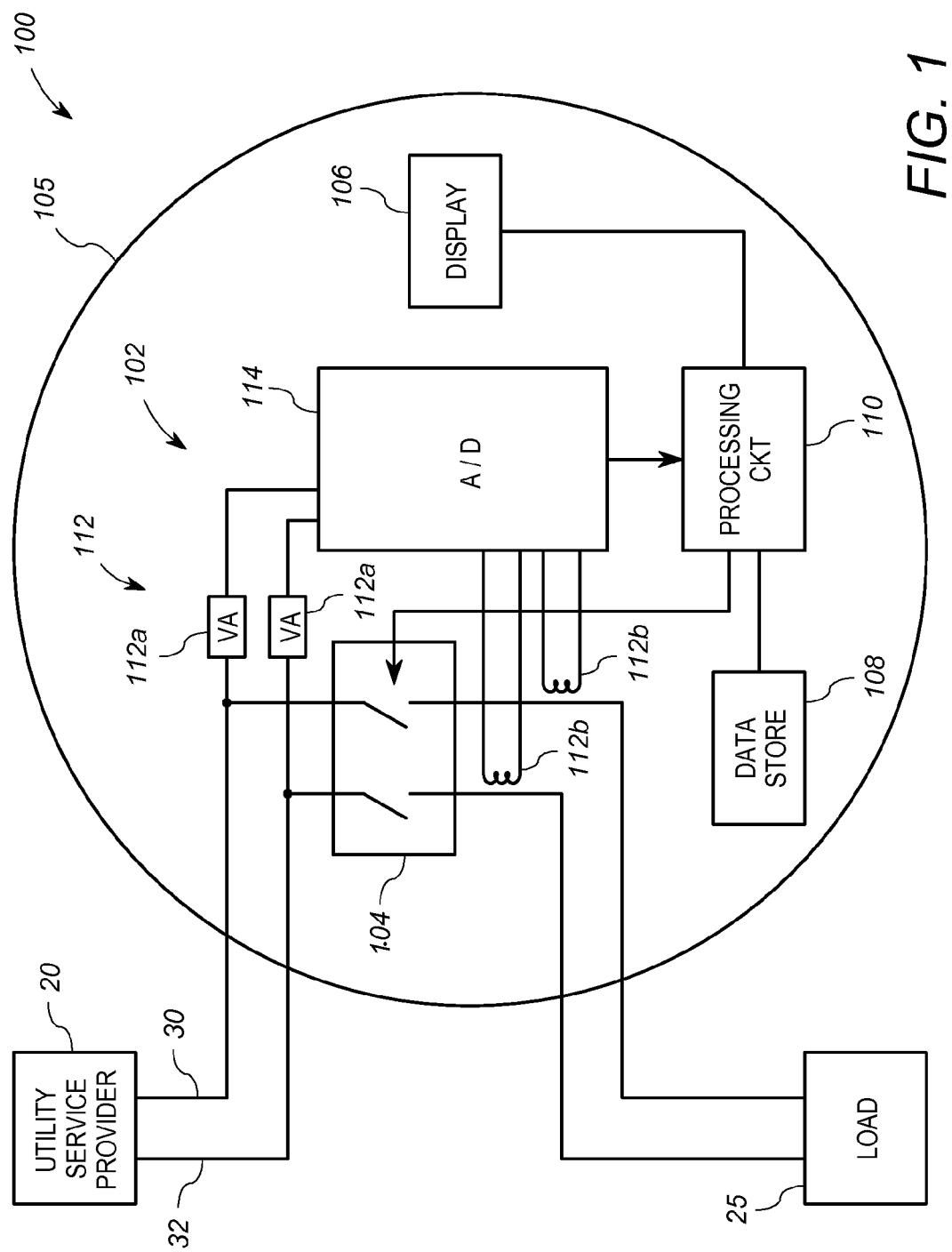
FIG. 1 shows a schematic diagram of a first example of an electricity meter incorporating an exemplary embodiment of the invention.

FIG. 1 shows an exemplary meter 100 that incorporates a protective disconnect arrangement according to at least one embodiment of the invention. The meter 100 includes a housing 105 in which are disposed a metrology circuit 102, a switch 104, a display 106, data storage 108 and a processing circuit 110. A primary function of the meter 100 is to securely measure and determine energy delivered from a utility service provider 20 to a load 25 via power lines 30, 32. In accordance with the embodiments described herein, the meter 100 also includes an arrangement that protects the load 25 from potentially damaging voltages, among other things. It will be appreciated that the illustration of two power lines 30, 32 is given by example only, and that the principles illustrated herein may readily be implemented in meters that measure energy on more power lines, such as in three-phase electrical systems.

Referring to the embodiment of FIG. 1, the housing 105 may take any suitable utility meter housing form. The housing 105 provides at least some protection against environmental conditions to the various elements disposed therein. Suitable housings for utility meters are well-known in the art. The housing 105 supports and/or contains the metrology circuit 102, the switch 104, the display 106, the data store 108 and the processing circuit 110.

The metrology circuit 102 is an electrical circuit configured to generate metering information regarding electrical power provided to the load. Such circuits are known in the art. To this end, the metrology circuit 102 includes a sensor circuit 112, as well as an A/D conversion unit 114. The sensor circuit 112 in one embodiment includes voltage sensors 112a and current sensors 112b that are operably coupled to detect voltage and current signals representative of voltage and current provided to the load 25, and to generate measurement signals therefrom. In particular, the measurement signals generated by the sensor circuit 112 are analog signals each having a waveform representative of the voltage and current provided to the load. Suitable voltage and current sensors are known in the art. The A/D conversion unit 114 may be any suitable analog-to-digital converter that is configured to sample the analog measurement signals generated by the sensor circuit 112.

The switch 104 is a device (and corresponding drive circuitry) that is configured to controllably interrupt a connection between the utility power service 20 and the load 25. The switch 104 has an open state that disconnects the utility power service 20 from the load 25, and a closed state that connects the utility power service 20 to the load 25.

The processing circuit 110 includes one or more digital signal processors, microcontrollers, microprocessors and/or other processing elements that are configured to receive the digital voltage and current measurement signals from the A/D conversion unit 114 and generate various energy consumption values therefrom, including RMS voltage information. According to an exemplary embodiment, the processing circuit 110 includes digital processing circuitry that processes the digitized measurement signals to thereby generate the energy consumption data. Such circuits are well known in the art.

In addition, the processing circuit 110 includes further functionality configured to exercise general supervisory control over data transmission, data display and data storage within the meter 100. In this embodiment, the processing circuit 110 is also configured to control the operation of switch 104 as described herein. Specifically, in the embodiment described herein, the processing circuit 110 is configured to determine whether a line voltage varies from an expected value by more than a predetermined amount over a predetermined amount of time, and to cause a change in state of the disconnect switch based on the determination.

In particular, in one embodiment, the processing circuit 110 is configured to cause the disconnect switch 104 to transition to the open state responsive to determining that the line voltage is out of an acceptable range for more than the predetermined amount of time. For example, the processing circuit 110 may, upon detecting that the line voltage has exceeded a nominal line voltage by more than 20% for over sixty seconds, cause the disconnect switch to transition from the closed state to the open state, thereby protecting the load 25 from the excessive voltage.

In addition, or in the alternative, in some embodiments, the processing circuit 110 is further configured to delay re-connecting the load 25 to the utility service provider 20 until a stable line voltage is detected. To this end, the processing circuit 110 in such embodiments is further configured to cause the switch 104 to transition to a closed state responsive to determining that the line voltage does not vary from the expected value by more than the predetermined amount (i.e. remains within an acceptable range) continuously for a predetermined amount of time. In other words, if the switch 104 is open, then it will not close again at least until the line voltage stays within an acceptable range of a nominal line voltage for a predetermined time period. For example, the switch 104 may not be closed until the line voltage remains within 10% of the nominal value for at least thirty seconds. It will be appreciated that other acceptable line voltage ranges and time periods may be employed.

In normal metering operation, the switch 104 is closed, and the load 25 receives energy from the service provider 20 via the power lines 30, 32. The voltage sensors 112*a* detect the voltage on the power lines and generate voltage measurement signals therefrom. Similarly, the current sensors 112*a* detect the current on the power lines and generate current measurement signals therefrom. The A/D conversion unit 114 generates digital voltage measurement signals and digital current measurement signals and provides the same to the processing circuit 110. The processing circuit 110 generates energy consumption values, and causes at least some of the values to be displayed on the display 106. The processing circuit 110 may suitably store other values in the data store 108.

The processing circuit 110 furthermore uses the digital measurement signals to determine the RMS line voltage, or at least a value representative of the RMS line voltage. The processing circuit 110 then uses that value to determine whether the line voltage exceeds the nominal (or expected) line voltage by more than a predetermined amount for a predetermined period of time. For example, if the nominal line voltage is 240 volts AC, then the processing circuit 110 may determine, based on the digital voltage measurement signals, whether the detected line voltage on the lines 30, 32 exceeds 300 volts AC for more than sixty seconds. If so, then the processing circuit 110 provides signals to the switch 104 that cause the switch 104 to transition from the closed state to the open state.

Once the switch 104 is transitioned to the open state, the load 25 is disconnected from the utility service provider 20. As a result, various equipment, not shown, at the load 25, which could be susceptible to damage from sustained voltage surges, are disconnected from the excessive line voltage.

The processing circuit 110 thereafter continues to receive voltage measurement signals in order to monitor the line voltage to determine whether it has returned to normal. Once the line voltage from utility service provider returns to normal, the load 25 may be reconnected. In this embodiment, processing circuit 110 further ensures that the line voltage has stabilized before causing the load 25 to be reconnected to the utility service provider 20.

To this end, the processing circuit determines whether the measured line voltage has not varied from the nominal voltage by a predetermined amount for more than a predetermined amount of time. It will be appreciate that the acceptable range of voltage (and the required time period) may be different for triggering reconnection than it is for triggering disconnection. For example, while the processing circuit 110 in the example discussed above only causes the switch to open if the voltage exceeds 300 volts for 60 seconds, the processing circuit may re-close the switch 104 only if the voltage is less than 270 volts for 45 continuous seconds.

Indeed, there can be advantages of requiring greater variance for opening the switch 104 and tighter restriction for closing the switch 104. For example, while in the above example, a line voltage of 275 volts is not high enough to initially disconnect service, it also is not low enough to reconnect a service that has already been disconnected. This "hysteresis" can be advantageous because, among other things, it helps ensure that the fault that caused the 300 volt surge has been sufficiently remedied.

In any event, once the processing circuit 110 determines that the line voltage has been within a predetermined range of the nominal voltage for a predetermined amount of time (i.e. more or less continuous), then the processing circuit 110 provides signals to the switch 104 that cause the switch to close. The switch 104 closes, thereby reconnecting the load 25 to the utility service provider 20.

As will be discussed below in connection with the embodiment of FIG. 2, the processing circuit 110 may also cause the switch 104 to open for reasons independent of whether the line voltage exceeds a nominal voltage. For example, the processing circuit 110 may cause the switch 104 to open for the purposes of energy rationing, or to effectuate a pre-paid energy delivery arrangement. In such cases, the meter 100 may include additional circuitry and/or devices to facilitate such functionality. Uses of a switch similar to switch 104 for the purposes of carrying out energy rationing or pre-paid energy delivery, are known in the art.

In the event of a disconnected that is not triggered by a voltage surge or voltage sag, the processing circuit 110 may, in accordance with the embodiment described herein, nevertheless ensure that the line voltage is stabilized before reconnecting the load to the service via the switch 104. In particular, when the processing circuit 110 determines that the load 25 should be reconnected to the utility service provider, the processing circuit 110 then obtains voltage measurements from the metrology circuit 102 and, as above, determines whether the line voltage is within range for a predetermined amount of time. Thus, even though it may be determined that utility service can be re-connected to a provider for other reasons (such as identification of payment by customer, or expiration of a timed disconnect), the processing circuit 110 first ensures that the line voltage is within acceptable range for a required amount of time.

Figure 2:
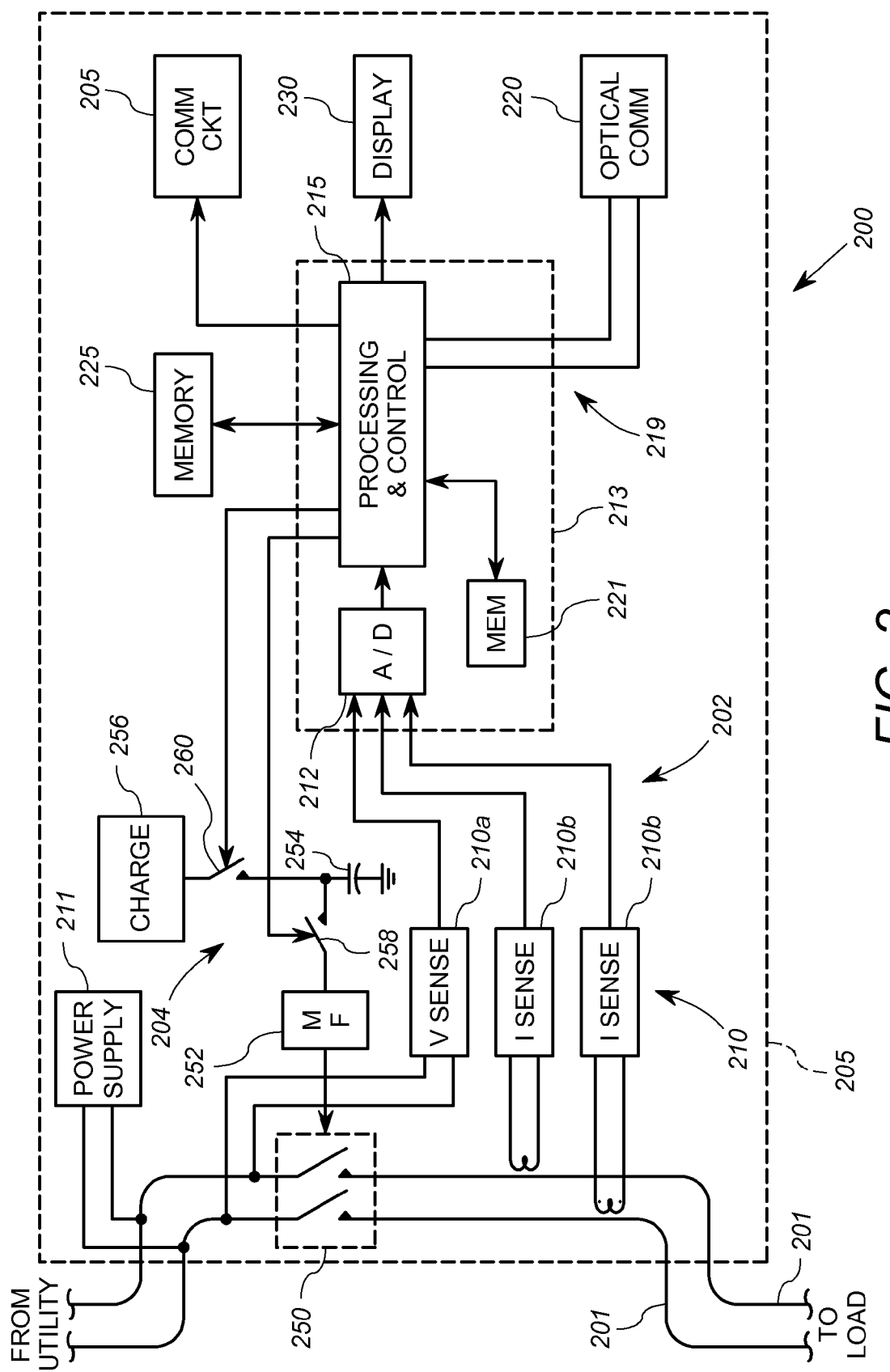
FIG. 2 shows a schematic diagram of a second example of an electricity meter that incorporates at least one embodiment of the invention.

FIG. 2 shows in further detail an alternative embodiment of a meter 200 that incorporates a protective disconnect arrangement according to at least one embodiment of the invention. In the embodiment of FIG. 2, the meter 200 includes a service switch arrangement 204 and other circuitry that allows for the customer load to be disconnected responsive to signals received from a remote device, such as those relating to load control, demand control, pre-payment, or billing delinquency. The service switch arrangement 204 is also used to protect the load against voltage surges.

Referring to FIG. 2, the meter 200 includes a housing 205 in which are disposed a metrology circuit 202, a service switch arrangement 204, a remote communication circuit 206, an optical communication circuit 220, data storage 225 and a display 230. The metrology circuit 202 further includes a sensor circuit 210, an A/D conversion unit 212, and at least a portion of a processing and control ("P&C") circuit 215.

It will be appreciated that in the exemplary embodiment, the P&C circuit 215 is disposed within a commercially available chip package 213 that includes the A/D conversion unit 212 and other circuitry normally associated with an electronic meter, such as memory 221, and clock circuitry, not shown. The commercially available chip package 213 may suitably be the Teridian 71M6513 measurement chip.

Referring now to the housing 205, the housing 205 may take any suitable form, and is generally configured to withstand a wide range of environmental conditions. The housing 205 also provides at least some protection against environmental conditions to the various elements disposed therein. Suitable housings for utility meters are well-known in the art.

As discussed above, the metrology circuit 202 includes the sensor circuit 210, as well as an A/D conversion unit 212 and the P&C circuit 215. The sensor circuit 210 in one embodiment includes voltage sensors 210a and current sensors 210b that are operably coupled to detect voltage and current signals representative of voltage and current provided to a load, and to generate measurement signals therefrom. In particular, the voltage sensors 210a provide analog measurement signals having a waveform representative of the voltage waveform provided to the load, and the current sensors 210b provide analog measurement signals having a waveform representative of the current waveform provided to the load. A suitable example of a voltage sensor 210a includes a resistive voltage divider that is operably coupled to the power lines 201. A suitable example of a current sensor 210b includes a current transformer that is disposed in a current sensing relationship with the power line signal. These and other voltage and current sensors are conventional.

The A/D conversion unit 212 may be any suitable analog-to-digital converter that is configured to sample the analog voltage measurement signals generated by the voltage sensors 210a and to sample the analog current measurement signals generated by the current sensors 210b. The A/D conversion unit 212 is operably coupled to provide the resulting digital voltage and current measurement signals to the P&C circuit 215.

The P&C circuit 215 is a circuit that is configured to receive the digital voltage and current measurement signals from the A/D conversion unit 212 and generate energy consumption data therefrom. According to an exemplary embodiment, the processing circuit 215 includes digital processing circuitry that processes the digitized measurement signals to thereby generate the energy consumption data. Such circuits are well known in the art. In general, many energy consumption calculations include multiplying contemporaneous digital voltage measurement signals and digital current measurement signals, and then summing the resulting products in an ongoing manner.

The P&C circuit 215 is also configured to process the digital measurement signals to generate other values, such as RMS current values and RMS voltage values. In the embodiment described herein, the P&C circuit 215 determines the RMS line voltage by first squaring the digital voltage measurement signal samples, averaging the squared samples over several AC waveform cycles, and then taking the square root of the average. The P&C circuit 215 may suitably determine RMS line current in the same manner. However, it will be appreciated that other methods of determining RMS voltage and current may be employed.

In addition, the P&C circuit 215 includes further functionality configured to exercise general supervisory control over data transmission, data display and data storage within the meter 200. In this embodiment, the P&C circuit 215 is also configured to control the service switch arrangement 204 as described herein.

Accordingly, the P&C circuit 215 performs energy data processing, as well as controller operations. In an alternative embodiment, the P&C circuit 215 may be split into two separate devices, such as a digital signal processor ("DSP") and a controller, to carry out these tasks.

The memory 221 of the chip package 213 includes one or more storage devices of different types. The memory 221 may include volatile or non-volatile RAM, EEPROM, or other readable and writeable memory device, any of which may be incorporated into the integrated circuit package 213. The memory 221 stores instructions and/or parameters used by the P&C circuit 215, and may further store energy consumption data.

By contrast, the memory 225 is external to the chip package 213, and provides for extended data storage. Such memory 225 would also, however, be located within the housing 205. In the embodiment described herein, the memory 225 may be written to, at least indirectly, remotely or via the optical communication circuit 220. To this end, the P&C circuit 215 may suitably configured to communicate with external devices via the communication circuit 206 and/or optical communication circuit 220, and, subject to various protocols and password protection, allow the external device to write values and/or firmware to memory 225. In this manner, various parameters within the meter 200 may be changed or altered without necessarily accessing the memory 221 within the chip 213. However, in some embodiments, at least a portion of the memory 221 may also be accessed in a similar manner.

In the embodiment described herein, the memory 225 also stores threshold values for disconnecting and reconnecting service voltage, as well as the time periods for requiring threshold values to be satisfied for disconnection and/or reconnection. In this embodiment, such values include a disconnect variance threshold $VR_{TD}$, a reconnect variance limit $VR_{TR}$, a time duration value that the disconnect threshold must be exceeded for disconnect, $T_D$, and a time duration value that the reconnect limit must be satisfied be for reconnect, $T_R$. The values $VR_{TR}$ and $VR_{TD}$ may suitably be expressed as either percentages or voltage values. Thus, for example, if the nominal voltage is 240 volts, and it is desired to disconnect the service if the line voltage varies by 25% or more, then the value $VR_{TD}$ may suitably be 0.25 (related to percentage) or 60 (25% of the nominal line voltage 240).

It will be appreciated that other versions of thresholds may be used, as will be discussed below. For example, it is possible that separate high voltage disconnect and low voltage disconnect thresholds (and/or time durations) would be provided, and that they may represent a different amount of variance from the nominal service voltage. Likewise, it is possible that separate high voltage reconnect and low voltage reconnect thresholds (and/or time durations would be provided). The various thresholds do not occupy large amounts of memory and thus several separate thresholds may be used. In addition, it will be appreciated that it is possible that some embodiments will not include a low voltage disconnect threshold because other protections are in place for such conditions. Furthermore, in some cases the memory 225 stores actual voltage thresholds, as oppose to variance thresholds. For example, the stored line voltage threshold may simply be 300 volts, as opposed to a 60 volt variance from 240 volts.

Referring to the embodiment of FIG. 2, as with other programmable values, it will be appreciated that the P&C circuit 215 is configured to receive different values $VR_{TD}$, $VR_{TD}$, $T_D$, $T_R$ from an external device via communication circuit 206 and/or 220 to allow for user selection of appropriate values. The P&C circuit 215 stores such received in the memory 225 and may later retrieve such values as needed.

The optical communication circuit 220 is operably coupled to the P&C circuit 215. The optical communication circuit 220 in this embodiment includes an optical transceiver, both of which are located at a translucent or transparent optical port, not shown. Similarly, the remote communication circuit 206 is operably coupled to the processing circuit 215. The remote communication circuit 206 may suitably be a power line modem, an RF transceiver, for example, a pager radio, or other wireless device that is capable of transmitting on a WAN, or on another wireless communication network.

The display 230 is operably coupled to the P&C circuit 215 and provides a visual display of information, such as information regarding the operation of the meter 200. For example, the display 230 may provide a visual display of information relating to the power measurement operations or energy consumption data of the meter 200. Suitable metering displays are well-known in the art.

The service switch arrangement 204 includes a service switch 250, source of motive force 252, a storage element 254, a charging circuit 256, a first switch 258, a second switch 260. The service switch 250 is operably coupled to controllably interrupt and restore connections in the power lines 201 from the utility to the load. The source of motive force 252 is connected to provide opening and closing force to the service switch 250. The storage element 254 may be a battery, super capacitor, ultracapacitor, or other suitable conventional storage element, and is operably connected to the source of motive force 252 via the first switch 258. The charging circuit 256 may suitably be the same as that described in U.S. patent application Ser. No. 12/832,983, filed Jul. 8, 2010, which is assigned to the assignee of the present invention and incorporated herein by reference. The charging circuit 256 is operably connected to the energy storage element 254 via the second switch 260. The P&C circuit 215 may suitably perform substantially the same operations as that of the control circuit 28 of FIG. 1 of U.S. patent application Ser. No. 12/832, 983. The first switch 258 may suitably comprises, or at least constitutes a portion of, the direction control circuit 30 of FIG. 1 of U.S. patent application Ser. No. 12/832,983, and the second switch 260 may suitably be the switch 32 of FIG. 1 of U.S. patent application Ser. No. 12/832,983.

It will be appreciated that the disconnect arrangement of U.S. patent application Ser. No. 12/832,983 is given by way of example only, and that other conventional disconnect or service switch arrangements may be configured as described herein to carry out the protective operations and other switching operations discussed herein. The inventive concepts provided herein are designed to be adaptable to existing service switch hardware.

The meter 200 also includes a power supply 211 operably connected to receive power from the power lines 201. The power supply 211 is configured to generate bias power for the circuitry of the meter 200 discussed above, including the chip package 213, the display 230, the communication circuits 206 and 220, and the charging circuit 256. In this embodiment, the power supply 211 does not provide power directly to the source of motive force 252, but rather via the charging circuit 256 and the energy storage device 254.

In normal energy delivery operation, the service switch 250 is closed, and the utility thereby provides electrical service to the load via power lines 201. The metrology circuit 202 performs operations to detect electrical signals on the power lines 201 and generating metering information therefrom. Such operations are known in the art. In such normal operation, the switch 260 may suitably be, but need not be, open, thereby operably disconnecting the charging circuit 256 from the energy storage device 254. Similarly, the first switch 258 is open.

From time to time, it may be necessary for the electrical service to be disconnected from the load. For example, if a sustained overvoltage is detected by the P&C circuit 215, then the electrical service will be disconnected, as will be discussed in detail further below in connection with FIG. 3. In addition, the P&C circuit 215 may determine that the electrical service is to be disconnected in accordance with a load control function (independent of service voltage level), or in accordance with payment information related to the customer. For example, if the customer (i.e. the load) is subject to a demand threshold, then the P&C circuit 215 may determine that the electrical service must be connected when the user demand for energy exceeds a limit for a predetermined period of time. In another example, if the customer (i.e. the load) is substantially delinquent in their payments, then a remote utility computer, not shown, may provide a disconnect command to the P&C circuit 215 via the communication circuit 206.

Responsive to any determination that a disconnect should occur, the P&C circuit 215 generates a signal causing the switch 260 to operably connect the charging circuit 256 to the charge storage device 254. As a consequence, the charging circuit 256 charges the previously discharged charge storage device 254. After a short time sufficient to allow the charge storage device 254 to be charged, the P&C circuit 215 provides a signal to first switch 258 that causes connection of the charge storage device 254 to the source of motive force 252 such that the source of motive force 252 rotates in an "opening" direction. Such rotation causes the switch 250 to move from the closed state to the open state.

However, it will be appreciated that in other embodiments, the P&C circuit 215 may cause another disconnect switch arrangement to disconnect in another suitable manner.

Referring again to the embodiment of FIG. 2, once the switch 250 is open, the load has been disconnected from utility electrical service. Thereafter, the service can be restored by closing the switch 250 in any suitable manner consistent with the operations described below.

As discussed above, the P&C circuit 215 causes the service switch 250 to transition to the open state when the service voltage (without regard to current or demand) is out range. In one embodiment, the P&C circuit 215 determines that the switch 250 should be disconnected when the line voltage on line 201 varies from the nominal line voltage (i.e. service voltage) by more than the variance threshold $VR_{TD}$ for more than the predetermined time duration $T_D$. By opening the service switch 250 and disconnecting the load, devices attached to the load side of the switch 250 would have some level of protection against being damaged by sustained high voltages. As discussed, above, the threshold $VR_{TD}$ and length of time $T_D$ may suitably be stored in one or more tables (or otherwise) within the memory 225. Table 1 below may suitably be used in a 240 volt AC electrical system:

TABLE 1

| 240 VAC | |
|---|---|
| $VR_{TR}$ | 24 |
| $T_D$ | 120 |
| $T_R$ | 45 |

In table 1, the values $VR_{TD}$ and $VR_{TR}$ are variance values in terms of voltage, and the values $T_D$ and $T_R$ are time values stored in seconds.

This embodiment may suitably employ a firmware algorithm stored in memory 221 or 225 that, when executed by the P&C circuit 215, causes the P&C circuit 215 to open the service switch 250 if the line voltage is determined to vary from the nominal or expected voltage by more than the programmable threshold $VR_{TD}$ for a programmable length of time $T_D$. For example if a 240 volt service was to have a voltage surge that exceeded line voltage by more than the threshold $VR_{TD}$ for more than 120 seconds, then the service switch 250 could be opened until such time that the service voltage comes down to approximately normal levels (varying no more than $VR_{TR}$) for the period of time $T_R$. The firmware algorithm may suitably refer to the memory location within the memory 225 to obtain the programmable values $VR_{TD}$, $VR_{TR}$, $T_D$, $T_R$.

Figure 3:
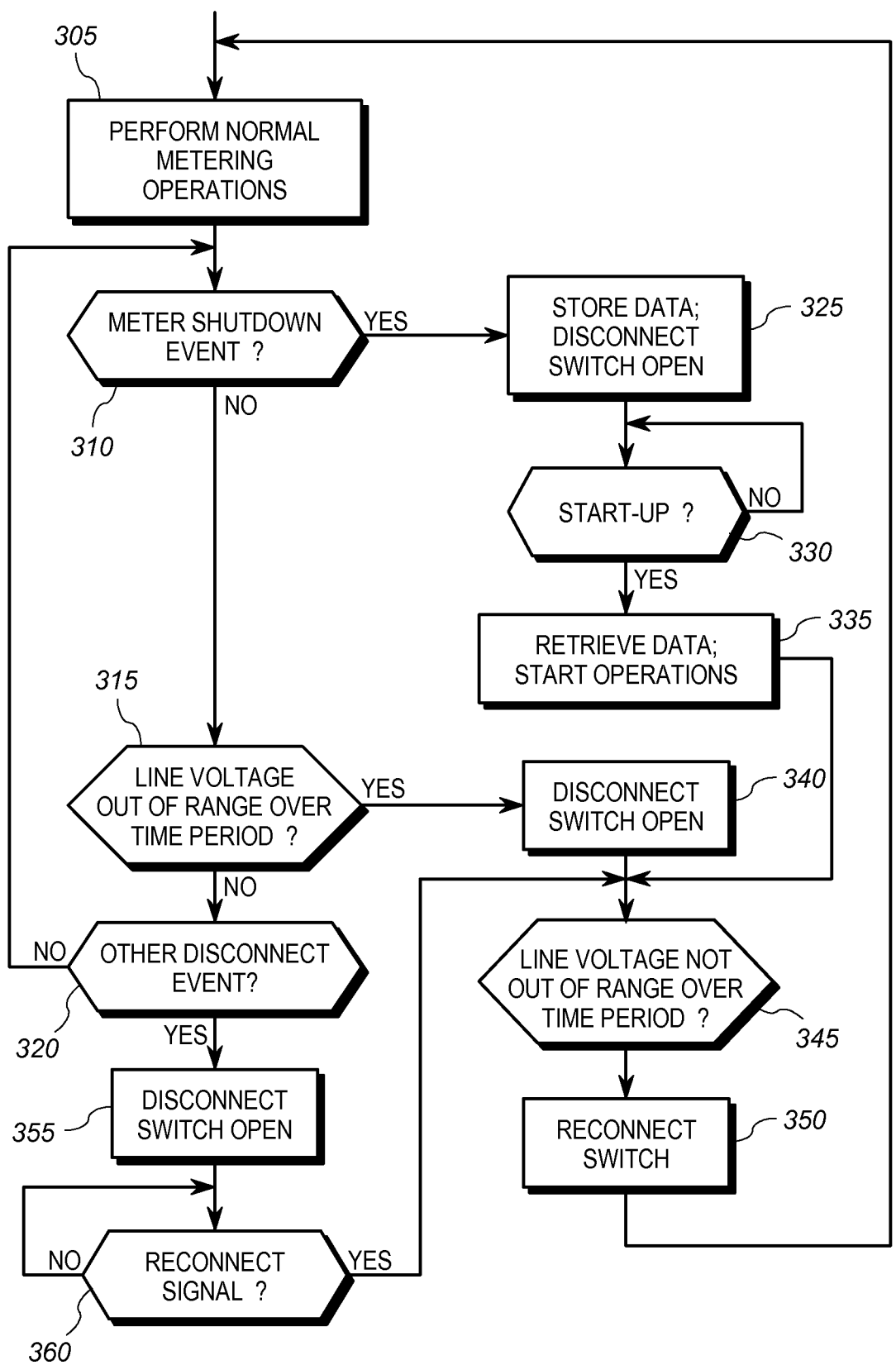
FIG. 3 shows a flow diagram of an exemplary set of operations performed by the processing circuit of the electricity meter of FIG. 1.

FIG. 3 shows an exemplary flow of operations of the P&C circuit 215, which may be stored as program instructions within the memory 225 and/or memory 221. Many of the details of normal metering operation are omitted from FIG. 3. Nevertheless, FIG. 3 shows sufficient detail of the normal metering operations to provide context to the inventive operations of this embodiment.

In step 305, the P&C circuit 215 performs normal metering operations in an ongoing manner. The normal metering operations include receiving digital voltage and current measurement signals from the A/D conversion unit 212, and generating energy consumption values therefrom. The P&C circuit 215 also calculates a running RMS voltage value by generating a running RMS calculation of digital voltage measurement signal values covering one or more 60 Hz cycles of the voltage waveform. It will be appreciated that the RMS voltage value need not be a strict running average of RMS voltage, but rather a simple average of the RMS voltage calculations over the last N cycles which is calculate every second, or on some other periodic basis. In any event, the P&C circuit 215 may generate an RMS current value in the same manner. The value representative of average or RMS line voltage is referenced herein as the value $V_{RMS}$. It will be appreciated that in polyphase meters, an RMS voltage will be calculated for each phase.

During normal operation, the P&C circuit 215 also performs display routines that display one or more of the calculated energy-related values on the display 230. Such operations are known. After step 305, the P&C circuit 215 continues performing normal metering values while other steps of FIG. 3 are being performed.

In step 310, the P&C circuit 215 determines whether a meter shutdown event is occurring. In particular, many electricity meters shutdown responsive to a power interruption on the utility power lines (i.e. a power outage), or physical disconnection of the meter 200 from the power lines. Some electricity meters may also shutdown responsive to an extremely high voltage that could potentially damage the meter power supply 211. Such operations are known. The P&C circuit 215 circuit can determine if a shutdown event is occurring, for example, by monitoring the output voltage of the power supply 211 in a known manner.

If the P&C circuit 215 determines that the meter is experiencing a meter shutdown event, then the P&C circuit 215 proceeds to step 325 to carry out a power-down routine, discussed further below. If not, then the P&C circuit 215 proceeds to step 315.

In step 315, the P&C circuit 215 determines whether the line voltage has varied from the nominal or expected line voltage by more than a predetermined amount for more than a predetermined amount of time. As discussed above, the P&C circuit 215 determines whether the RMS line voltage $V_{RMS}$ varies from the nominal line voltage $V_{serv}$ by more than the threshold $VR_{TD}$ for more than the time $T_D$. Further detail regarding an exemplary way to carry out step 315 is provided below in connection with FIG. 4.

Figure 4:
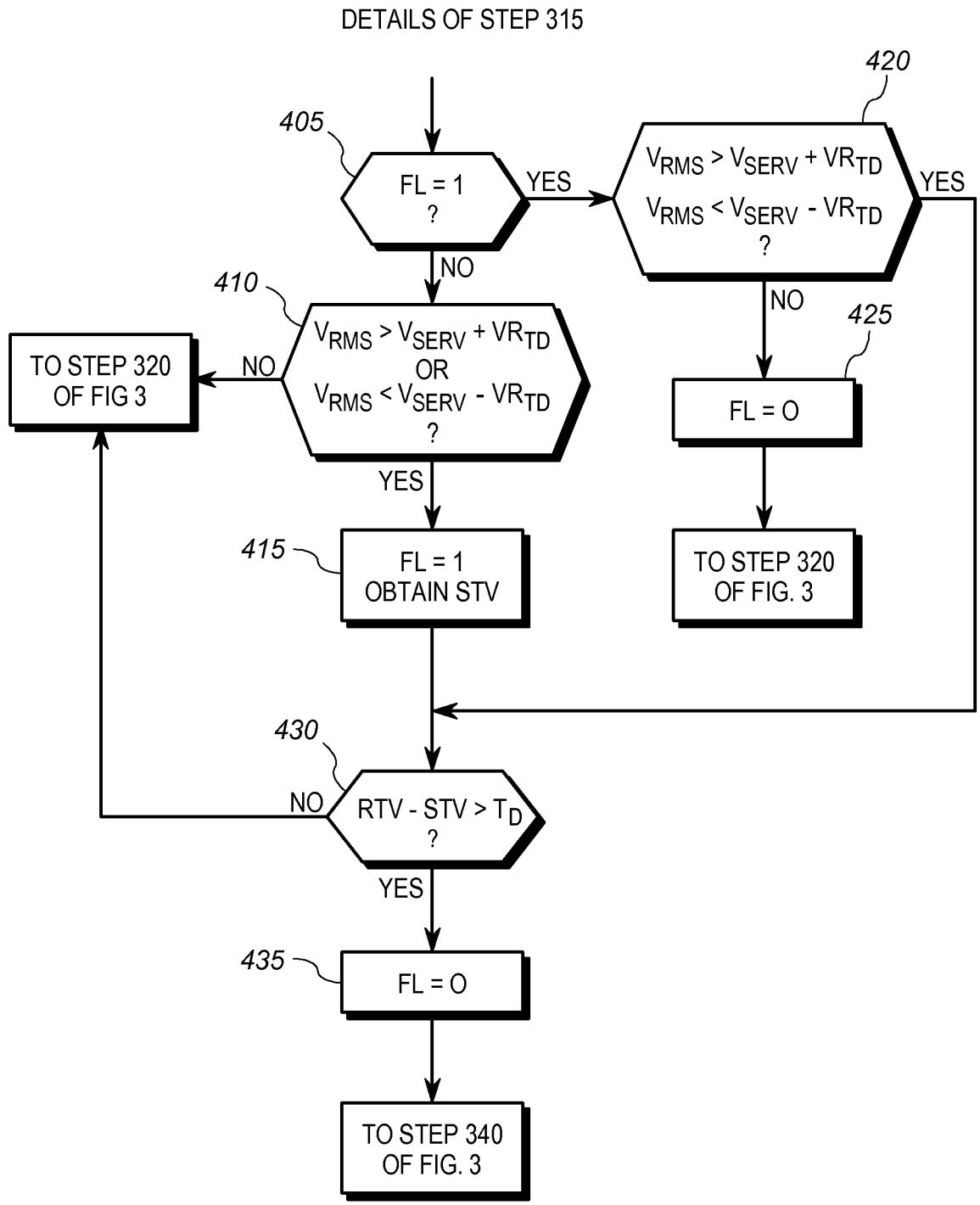
FIG. 4 shows in further detail an exemplary flow diagram of operations for detecting sustained out-of-range line voltage conditions.

Referring to FIG. 4, the P&C circuit 215 performs the steps of FIG. 4 to determine whether the line voltage has varied from the nominal or expected line voltage by more than predetermined amount for more than a predetermined amount of time. In this embodiment, it will be assumed that the value $VR_{TD}$ is expressed as a voltage value, and that $T_D$ is expressed in seconds. However, it will be appreciated that the exact units used may vary from implementation to implementation.

In step 405, the P&C circuit 215 determines whether a flag FL is set to 1. The state of the flag FL, as will be discussed below, indicates whether the P&C circuit 215 has most recently determined that the line voltage is outside of acceptable limits. If the flag FL is not set to 1 (i.e. no prior detection of excessive voltage variance), then the P&C circuit 215 proceeds to step 410. If, however, the flag FL is set to 1, then the P&C circuit 215 proceeds to step 420.

In step 410, the P&C circuit 215 determines whether the current RMS voltage value (calculated as per normal metering operations) $V_{RMS}$ varies from the nominal voltage $V_{serv}$ by more than the variance threshold $VR_{TD}$. In particular, the P&C circuit 215 determines whether $V_{RMS}$ is greater than $V_{serv}+VR_{TD}$, or less than $V_{serv}-VR_{TD}$. In some embodiments, the P&C circuit 215 may only determine whether the current RMS voltage value exceeds an overall high voltage threshold. In either event, if the current RMS voltage value is out of the acceptable range, then the P&C circuit 215 proceeds to step 415. If not, then the P&C circuit 215 proceeds to the next step 320 of FIG. 3, because the value $V_{RMS}$ has not varied from the nominal voltage $V_{serv}$ by more than the variance threshold $VR_{TD}$.

In step 415, the P&C circuit 215 sets the flag FL equal to 1, and identifies and stores a start time value STV. The P&C circuit 215 may suitably obtain the value STV from a real-time clock maintained with the P&C circuit 215, or by some other device within the meter 200. It will be appreciated that most electronic meters maintain real-time clocks. However, in alternative embodiments, the P&C circuit 215 may employ a separate time counter. The P&C circuit 215 thereafter proceeds to step 430.

In step 420, the P&C circuit 215 also determines whether the current RMS voltage value (calculated as per normal metering operations) $V_{RMS}$ varies from the nominal voltage $V_{serv}$ by more than the variance threshold $VR_{TD}$. If the current RMS voltage value is out of the acceptable range, then the P&C circuit 215 proceeds to step 430. If not, then the P&C circuit 215 proceeds to step 425.

In step 425, which is reached because the line voltage is determined to be within the variance threshold $VR_{TD}$, the P&C circuit 215 resets the flag FL to 0. The P&C circuit 215 thereafter proceeds to step 320 of FIG. 3 because the value $V_{RMS}$ no longer varies from the nominal voltage $V_{serv}$ by more than the variance threshold $VR_{TD}$.

In step 430, the P&C circuit 215 determines whether the time that the flag FL has been set to 1 exceeds a predetermined threshold value $T_D$. In particular, the P&C circuit 215 obtains the real-time value RTV, and determines whether RTV−STV>$T_D$. If not, then the P&C circuit 215 proceeds to the next step in FIG. 3 corresponding to the answer "no", i.e. step 320. In other words, if RTV−STV≤$T_D$, then the value $V_{RMS}$ has not varied from the nominal voltage $V_{serv}$ by more than the variance threshold $VR_{TD}$ by more than a time duration $T_D$.

If, however, the P&C circuit 215 determines that RTV−STV>$T_D$, then the P&C circuit 215 proceeds to step 435. In step 435, the P&C circuit 215 resets the flag FL to 0, and the proceeds to the next step 340 in FIG. 3 corresponding to the answer "yes". In other words, the P&C circuit 215 has determined that the value $V_{RMS}$ has varied from the nominal voltage $V_{serv}$ by more than the variance threshold $VR_{TD}$ for more than a time duration $T_D$. The P&C circuit 215 may also suitably set a fault flag FF equal to 1 indicating the determined line voltage fault.

Thus, in FIG. 4, the P&C circuit 215 determines the length of time (RTV−STV) that the line voltage is above or below acceptable threshold levels. If an out-of-range voltage falls back within acceptable range of the nominal voltage (below the high voltage threshold or above the low voltage threshold) before the time duration $T_D$ is reached, then the P&C circuit 215 resets the flag FL to 0. If the time duration RTV−STV of the out-of-range condition exceeds the value equivalent to $T_D$, then the P&C circuit 215 has determined the existence of the line voltage fault.

Referring again to FIG. 3, if the answer in step 315 (see FIG. 4) is "yes", then the P&C circuit 215 proceeds to step 340 to open the switch 250. If not, however, then the P&C circuit 215 proceeds to step 320.

In step 320, the P&C circuit 215 determines whether another switch disconnect event has occurred. In particular, as discussed above, it is known to use remote signals to cause a service switch such as the service switch 250 to be opened, for example, due to account delinquency, or the like. It is also known for a processing circuit such as the P&C circuit 215 to determine that the service switch 250 should be opened because a demand threshold has been exceeded, or for some other reason not related to the line voltage threshold. Accordingly, if the P&C circuit 215 determines that such a disconnect event has occurred, then the P&C circuit 215 proceeds to step 355. If not, then the P&C circuit 215 returns to step 310 to proceed as discussed above in an ongoing loop while normal metering operations continue to occur.

Referring now to step 325, as discussed above, the P&C circuit 215 executes step 325 when a meter shutdown event is detected. In step 325, the P&C circuit 215 performs power down operations, such as storing meter data to the non-volatile memory 225. The P&C circuit 215 also stops the normal metering operations discussed above in connection with step 305. In addition, in step 325, the P&C circuit 215 causes the switch 250 to transition to the open state in the manner discussed further above in connection with FIG. 2. Thus, upon power down, the P&C circuit 215 stops metering operations, stores data, and disconnects the customer load from the utility power lines via the service switch 250. The P&C circuit 215 thereafter proceeds to step 330. In step 330, which is sometimes performed in a so-called sleep mode of the P&C circuit 215, the P&C circuit 215 monitors to determine whether the meter 200 is starting up again. To this end, the P&C circuit 215 detects start-up when it receives power from the power supply 211, indicating that power has returned to the utility lines, or that the meter 200 has been physically reconnected to the power lines.

If the P&C circuit 215 in step 330 detects power from the power supply 211, then the P&C circuit 215 proceeds to step 335. If not, then the P&C circuit 215 returns to step 330 to continue monitoring in the sleep mode.

In step 335, the P&C circuit 215 retrieves data that had been stored in the memory in step 325 and performs other conventional start-up operations. The P&C circuit 215 also commences normal metering operations, including but not limited to obtaining digital voltage and current measurement values from the A/D conversion unit 212. It will be appreciated that because the service switch 250 is open, the digital current measurement values will be substantially zero. In any event, the P&C circuit 215 starts determining, among other things, $V_{RMS}$, on an on-going basis. The P&C circuit 215 thereafter proceeds to step 345.

In step 345, the P&C circuit 215 determines whether and when the line voltage is within acceptable range for a continuous period that exceeds a predetermined threshold. In particular, the P&C circuit 215 determines whether the line voltage does not vary from the nominal or expected line voltage continuously for a predetermined period of time. The P&C circuit 215 performs this step to attempt to ensure that the line voltage is stabilized before reconnecting the customer load. In the operation of step 345, the P&C circuit 215 may suitably perform the operations of FIG. 5.

Figure 5:
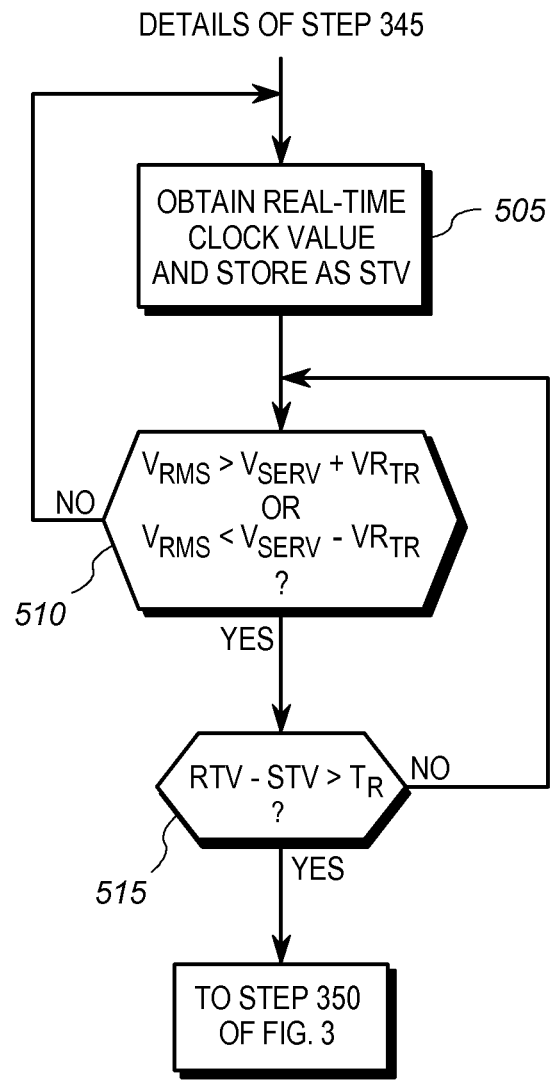
FIG. 5 shows in further detail an exemplary flow diagram of operations for detecting stable in-range line voltage conditions.

In FIG. 5, the P&C circuit 215 in step 505 obtains the real-time value from the real time clock and stores the same as value STV in a register or memory. The P&C circuit 215 thereafter proceeds to step 510. In step 510, the P&C circuit 215 determines whether the line voltage $V_{RMS}$ is within acceptable range of the nominal line voltage $V_{serv}$. To this end, the P&C circuit 215 compares the latest calculated RMS voltage value to a high threshold and a low threshold representative of the upper and lower acceptable voltage limits for the service. In one embodiment, the P&C circuit 215 determines whether $V_{RMS}$ is less than $V_{serv}+VR_{TR}$, or greater than $V_{serv}-VR_{TR}$. If the P&C circuit 215 determines that RMS line voltage is within acceptable limits, then the P&C circuit 215 proceeds to step 515. If not, then the P&C circuit 215 returns to step 505 to reset the value STV to the current real-time clock value.

In step 515, the P&C circuit 215 obtains the current real-time value RTV from the meter real-time clock and determines whether RTV−STV>$T_R$. In other words, the P&C circuit 215 determines the line voltage $V_{RMS}$ has been within acceptable limits for the predetermined stabilization time value. If so, then the P&C circuit 215 proceeds to the next step 350 of FIG. 3. If not, then the P&C circuit 215 returns to the step 510. Thus, until the line voltage can stay within bounds for the time $T_R$, step 345 is not successfully completed.

It will be appreciated that the operations of step 345 may be carried out in other suitable ways.

Referring again to FIG. 3, once requirements of step 345 are satisfied, the P&C circuit 215 executes step 350. In step 350, the P&C circuit 215 causes the service switch 250 to transition to the closed state. Accordingly, the load is reconnected to the utility service provider via the service switch 250. The operations of steps 345 and 350 ensure that the load is not connected to the utility service provider until there is an indication that the line voltage has stabilized.

After step 350, the P&C circuit 215 continues normal metering operations, returns to step 310, and proceeds accordingly.

Reference is now made to step 340, which is executed if the line voltage is determined to be out of range in step 315, discussed above. In step 340, the P&C circuit 215 causes the service switch 250 to transition to the open state. In other words, because the line voltage was determined to be out of range for more than a predetermined amount of time in step 315, the load is disconnected from the utility service provider via the service switch 250.

After step 340, the P&C circuit 215 proceeds to step 345. As discussed above, the P&C circuit 215 determines in step 345 whether and when the line voltage remains within an acceptable range for a predetermined stabilization time. The P&C circuit 215 thereafter operates as discussed above.

Reference is now made to step 355, which is executed if the service switch 250 is opened for reasons other than the line voltage being out of range. In step 355, the P&C circuit 215 causes the service switch 250 to transition to the open state. As a consequence, the load is disconnected from the utility service provider. The P&C circuit 215 thereafter proceeds to step 360.

In step 360, the P&C circuit 215 determines whether a reconnect signal has been received. In particular, when service is interrupted due to factors other than the line voltage being out of range, the P&C circuit 215 typically obtains a signal from another device via one of the communication circuits 206 or 220 indicating that the service may be reconnected. In some cases, the P&C circuit 215 may generate such a signal internally, for example, in load control operations. For example, if the meter 200 is configured to limit energy to the load (for purposes of load control) by opening the service switch 250, then the P&C circuit 215 may be configured to reconnect the load after a predetermined amount of time, such as 15 minutes. In any event, once a signal is obtained indicating that the service may be restored (independent of the measured line voltage), then the P&C circuit 215 proceeds to step 345. The P&C circuit 215 thereafter executes steps 345 and 350 as discussed above.

Accordingly, the embodiment of FIG. 2 performing the steps of FIG. 3 not only protects the load by disconnecting the load when a sustained voltage surge is detected, but also delays re-connecting the load until there is an indication that the line voltage has stabilized, even if the service was disconnected for other reasons.

It will be appreciated that one advantage of the embodiment of FIGS. 2 and 3 is that it addresses situations in which the line voltage is sufficiently high to potentially damage the meter 200. In such a case, if the P&C circuit 215 or some other voltage sensor circuit determines that the voltage has abruptly increased to levels that are potentially damaging to the meter 200, then the P&C circuit 215 or some other circuit element, not shown, initiates a power down routine, as per steps 310 and 325. In some cases, the power supply 211 itself may fail under circumstances of abruptly increased voltage levels, which can trigger the detection of the severe event. As discussed above, the power down routine is inherently run anytime the power supply 211 stops providing a normal power output. As also discussed above in connection with FIG. 3 (step 325), the P&C circuit 215 issues a command to initiate the sequence to open the service switch 250 upon a meter power-down event. This command to open the switch 250 could be part of the power down routine in one embodiment only when the power down is first preceded by detection of an abrupt voltage swell. The required voltage detection may suitably be carried out via the voltage sensors 210a, the A/D circuit 212, and portion of the P&C circuit 215, as is done for normal metrology operations.

In this case there is also a need to have sufficient energy storage capacity to operate the service switch 250 in the event of a power supply failure. The embodiment of FIG. 2 includes such storage capacity in the storage element 254.

It will further be appreciated that in the embodiment of FIGS. 2 and 3, the P&C circuit 215 is configured upon powering up to confirm that the line voltage is within a required specified range and is stable within the specified range for a predetermined period of time, before closing the switch 250. As a result, household equipment could be protected from experiencing erratic and unpredictable power restoration events. For example, sometimes power is restored for only a few cycles and then collapses again. This restoration and subsequent collapse may occur several times causing undue stress on appliances and other devices attached to the line 201. The meter 200 discussed above protects against such undue stress.

It will also be appreciated that some or all of the detection and other operations of the P&C circuit 215 may be carried out in hardware, where an extreme voltage swell automatically initiates a switch opening operation using an overvoltage sensing circuit. In other words, a hardware circuit may be configured to detect a sustained overvoltage of a predetermined time and automatically open the switch 250 without the need to involve the processor. Similarly, a hardware circuit may be configured to, upon power restoration after opening the switch 250 and powering down, to implement a delay feature that would delay closing of the service switch 250 until voltage was present for a period of time such as 1 minute.

It will be appreciated that ANSI standards identify proper meter operation over a voltage range from 90% to 110% of nominal line voltage. This range could be used to guide the threshold set in the meter to trigger a switch opening, and/or switch re-closing.

In another embodiment, it will be appreciated that multiple high voltage variance levels and/or multiple low voltage variance levels may be implemented. In such a case, separate time limits associated with such thresholds would also be implemented. To this end, for disconnect purposes, the wider variance threshold requires less of a time duration to trigger shutdown than a narrower variance threshold. For example, if the nominal voltage is 240 volts, the meter 200 may employ a first threshold at 270 volts and a second threshold at 300 volts, wherein the P&C circuit 215 causes a disconnect if the first threshold is exceed for 2 minutes, or if the second threshold is exceeded for 45 seconds. In this way, greater variances are tolerated for a shorter time than smaller variances. The operations of FIGS. 4 and 5 may readily be modified to carry out such multiple variance threshold operations.

It will further be appreciated that although the RMS voltage values are convenient quantities to use for threshold testing, other quantities may instead be used, such as, for example, peak voltage (per cycle), or the average of the absolute value of the voltage signal.

It will be appreciated that the above-describe embodiments are merely exemplary, and that those of ordinary skill in the art may readily devise their own implementations and adaptations that incorporate the principles of the present invention and fall within the spirit and scope thereof. For example, it will be readily apparent that the load protection arrangement may be implemented on a per-phase basis of a polyphase meter.

We claim:

1. An arrangement for controllably disconnecting a utility power service from a load, comprising:
   a utility meter housing including metrology circuitry configured to generate metering information regarding electrical power provided to the load;
   a switch supported by the utility meter housing and operably connected to controllably interrupt a connection between the utility power service and the load, the switch having a disconnected state and a connected state;
   a processing circuit executing program instructions stored in memory to:
   determine whether a line voltage varies from an expected value by more than a predetermined amount over a predetermined amount of time; and
   cause a change in state of the switch based on the determination.

2. The arrangement of claim 1, wherein the processing circuit further executes the program instructions stored in memory to cause the change in the state of the switch by causing the switch to transition to the disconnected state responsive to determining that the line voltage varies from the expected value by more than the predetermined amount for more than the predetermined amount of time.

3. The arrangement of claim 2, wherein the predetermined amount is between ten percent and twenty percent of the expected line voltage.

4. The arrangement of claim 3, wherein the predetermined amount of time is at least one minute.

5. The arrangement of claim 1, wherein the processing circuit further executes the program instructions stored in memory to cause the change in the state of the switch by causing the switch to transition to the connected state responsive to determining that the line voltage does not vary from the expected value by more than the predetermined amount over the predetermined amount of time.

6. The arrangement of claim 1, further comprising a communication circuit, and wherein the processing circuit is further configured to receive at least one value representative of at least one of the group of the predetermined amount and predetermined amount of time via the communication circuit.

7. The arrangement of claim 1, wherein the processing circuit further executes the program instructions stored in the memory to:
   cause the change in the state of the switch by causing the switch to transition to the disconnected state responsive to determining that the line voltage varies from the expected value by more than the predetermined amount for more than the predetermined amount of time; and
   cause the change in the state of the switch by causing the switch to transition to the connected state responsive to determining that the line voltage does not vary from the expected value by more than a second predetermined amount over a second predetermined amount of time.

8. An arrangement for controllably disconnecting a utility power service from a load, comprising:
   a utility meter housing including metrology circuitry configured to generate metering information regarding electrical power provided to the load;
   a switch supported by the utility meter housing and operably connected to controllably interrupt a connection between the utility power service and the load, the switch having an open state and a closed state;
   a memory storing at least a first threshold and at least a first time threshold;
   a processing circuit executing program instructions stored in the memory to:
   determine using the first threshold whether a line voltage varies from an expected value by more than a predetermined amount over an amount of time that exceeds the first time threshold; and
   cause a change in state of the switch based on the determination.

9. The arrangement of claim 8, wherein the processing circuit further executes the program instructions stored in memory to cause the change in state of the switch by causing the switch to be in the open state.

10. The arrangement of claim 9, wherein the first threshold is representative of a variance amount, and wherein the processing circuit further executes the program instructions stored in memory to determine whether the line voltage varies from the expected value by determining whether the line voltage varies from the expected value by at least the first threshold.

11. The arrangement of claim 9, wherein the first threshold is representative of a limit, and wherein the processing circuit further executes the program instructions stored in memory to determine whether the line voltage varies from the expected value by determining whether the line voltage exceeds the first threshold.

12. The arrangement of claim 8, wherein the processing circuit further executes the program instructions stored in memory to cause the change in state of the switch by causing the switch to be in the closed state.

13. The arrangement of claim 12, wherein the first threshold is representative of a variance amount, and wherein the processing circuit further executes the program instructions stored in memory to determine whether the line voltage varies from the expected value by determining whether the line voltage varies from the expected value by less than the first threshold.

14. The arrangement of claim 12, further comprising a communication circuit, and wherein the processing circuit further executes the program instructions stored in memory to receive the first threshold via the communication circuit, and to store the first threshold in the memory.

15. The arrangement of claim 8, wherein
   the memory further stores at least a second threshold and at least a second time threshold;
   the processing circuit further executes the program instructions stored in memory to:

determine using the second threshold whether a line voltage varies from the expected value by more than a second predetermined amount over an amount of time that exceeds the second time threshold; and cause a change in state of the switch based on the determination.

16. The arrangement of claim 15, wherein the first threshold exceeds the second threshold, and the second time threshold exceeds the first time threshold.

17. The arrangement of claim 8, wherein the memory further stores at least a second threshold and at least a second time threshold;

the processing circuit further executes the program instructions stored in the memory to:

determine using the second threshold whether a line voltage varies from the expected value by more than a second predetermined amount over an amount of time that exceeds the second time threshold; and cause a change in state of the switch based on the determination.

18. The arrangement of claim 17, wherein the first threshold exceeds the second threshold, and the second time threshold exceeds the first time threshold.

19. A method for controllably disconnecting a utility power service from a load, comprising:

determining in a processing circuit whether a line voltage varies from an expected value by more than a predetermined amount over a predetermined amount of time, the processing circuit supported in a utility meter housing including metrology circuitry configured to generate metering information regarding electrical power provided to the load;

causing a change in state of a switch based on the determination, the switch supported by the utility meter housing and operably connected to controllably interrupt a connection between the utility power service and the load, the switch having an open state and a closed state.

20. The method of claim 19, wherein:

the predetermined amount is between ten percent and twenty percent of the expected line voltage; and the predetermined amount of time is at least one minute.

* * * * *